(12) United States Patent
Alston

(10) Patent No.: US 7,251,483 B1
(45) Date of Patent: Jul. 31, 2007

(54) SYSTEMS AND METHODS FOR PROVIDING DATA RATE INDICATIONS

(75) Inventor: Douglas B. Alston, Fayetteville, GA (US)

(73) Assignee: AT&T Intellectual Property, Inc., Wilmington, DE (US)

( * ) Notice: Subject to any disclaimer, the term of this patent is extended or adjusted under 35 U.S.C. 154(b) by 340 days.

(21) Appl. No.: 10/623,898

(22) Filed: Jul. 21, 2003

(51) Int. Cl.
*H04Q 7/20* (2006.01)

(52) U.S. Cl. ............... 455/423; 455/67.11; 455/452.2; 455/453; 370/252

(58) Field of Classification Search ............ 455/67.11, 455/453, 423–425, 452.2, 566; 370/252, 370/328, 338
See application file for complete search history.

(56) References Cited

U.S. PATENT DOCUMENTS

| | | | |
|---|---|---|---|
| 6,480,497 B1* | 11/2002 | Flammer et al. ............ 370/400 |
| 6,668,159 B1* | 12/2003 | Olofsson et al. .......... 455/226.1 |
| 6,901,051 B1* | 5/2005 | Hou et al. ................... 370/231 |
| 7,047,304 B2* | 5/2006 | Senapati et al. ............ 709/229 |
| 2004/0044761 A1* | 3/2004 | Phillipi et al. .............. 709/223 |
| 2004/0058651 A1* | 3/2004 | Ross et al. ................ 455/67.11 |
| 2004/0192322 A1* | 9/2004 | Dacosta et al. ........... 455/452.1 |
| 2004/0259555 A1* | 12/2004 | Rappaport et al. .......... 455/446 |
| 2005/0030891 A1* | 2/2005 | Stephens et al. ............ 370/229 |
| 2005/0068891 A1* | 3/2005 | Arsikere et al. ............ 370/232 |
| 2005/0148335 A1* | 7/2005 | Benco et al. ................ 455/445 |
| 2005/0197147 A1* | 9/2005 | Stephens et al. ............ 455/522 |

* cited by examiner

*Primary Examiner*—Duc M. Nguyen
*Assistant Examiner*—Anthony S. Addy
(74) *Attorney, Agent, or Firm*—Potomac Patent Group PLLC

(57) ABSTRACT

A system including a service measurement database having stored therein network service measurement data relating to a network and a server in communication with the service measurement database, wherein the server estimates a data throughput for a device that is in communication with the network based on the network service measurement data and a parameter received from the device that is in communication with the network.

15 Claims, 3 Drawing Sheets

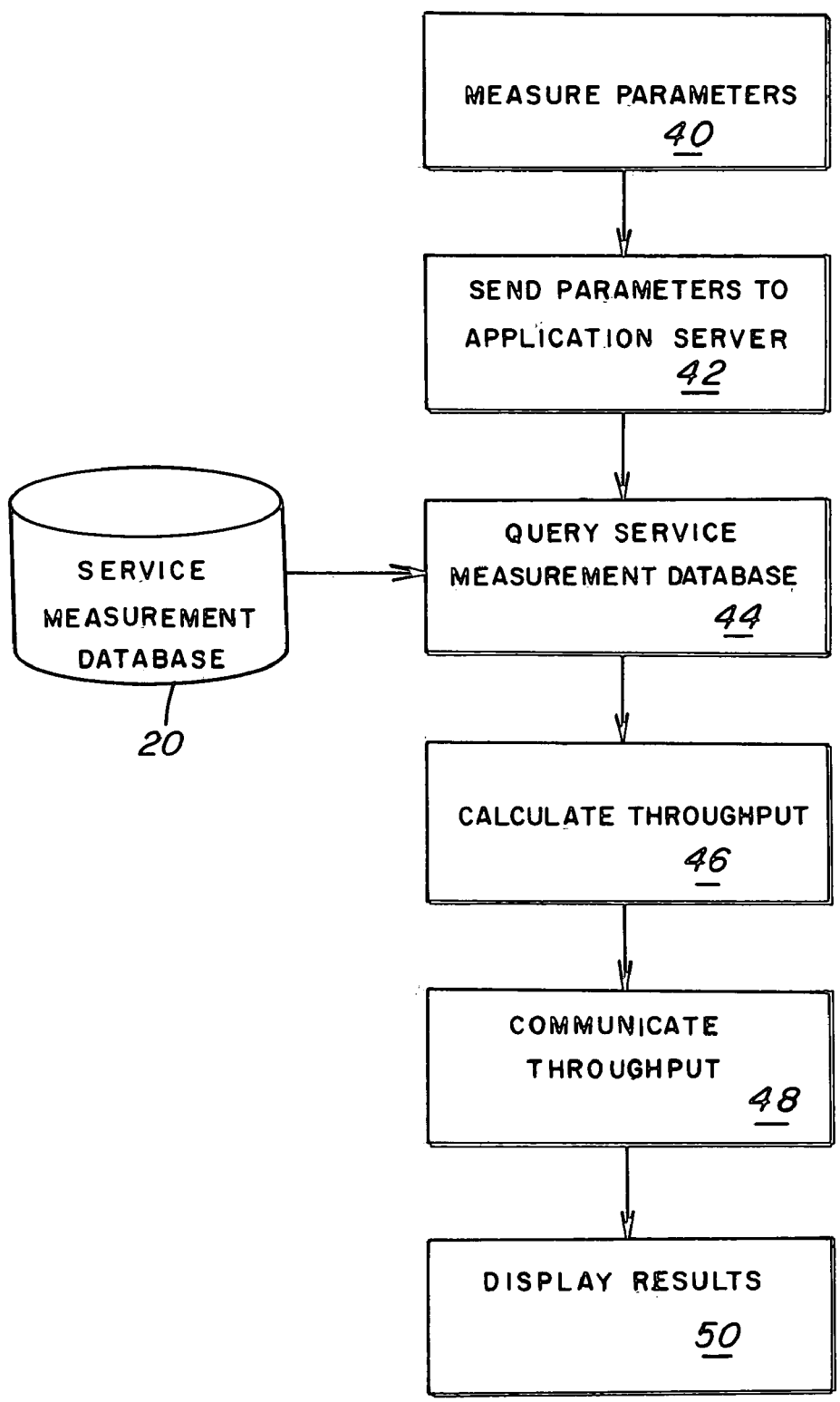

SYSTEMS AND METHODS FOR PROVIDING DATA RATE INDICATIONS

BACKGROUND

The present invention relates generally to systems and methods for providing data rate indications.

Signal strength indicators are often used on equipment such as mobile or wireless terminal devices and provide an indication of received signal strength at the devices. Such indicators are often iconic and provide merely an indication of signal strength without taking into account factors such as network loading conditions that would lead to a more accurate estimate of network performance (e.g. data throughput, voice quality, etc.) that a user may be likely to experience.

SUMMARY

In one embodiment, the present invention is directed to a system including a service measurement database having stored therein network service measurement data relating to a network and a server in communication with the service measurement database, wherein the server estimates a data throughput for a device that is in communication with the network based on the network service measurement data and a parameter received from the device that is in communication with the network.

In one embodiment, the present invention is directed to a method of communicating a relative network throughput to a user of a device. The method includes receiving a first parameter from a communications device that is in communication with the computing device and receiving a second parameter from a service measurement database. The method also includes calculating the relative network throughput based on the first and second parameters and communicating the network throughput to the communications device.

In one embodiment, the present invention is directed to an apparatus including means for receiving a first parameter from a communications device that is in communication with the computing device and means for receiving a second parameter from a service measurement database. The apparatus also includes means for calculating a network throughput based on the first and second parameters and means for communicating the network throughput to the communications device.

BRIEF DESCRIPTION OF THE DRAWINGS

Further advantages of the present invention may be better understood by referring to the following description taken in conjunction with the accompanying drawings, in which:

FIG. 3 is a diagram illustrating a process of providing data rate indications according to one embodiment of the present invention.

DESCRIPTION

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these and other elements may be desirable. However, because such elements are well known in the art, and because they do not facilitate a better understanding of the present invention, a discussion of such elements is not provided herein.

Figure 1:
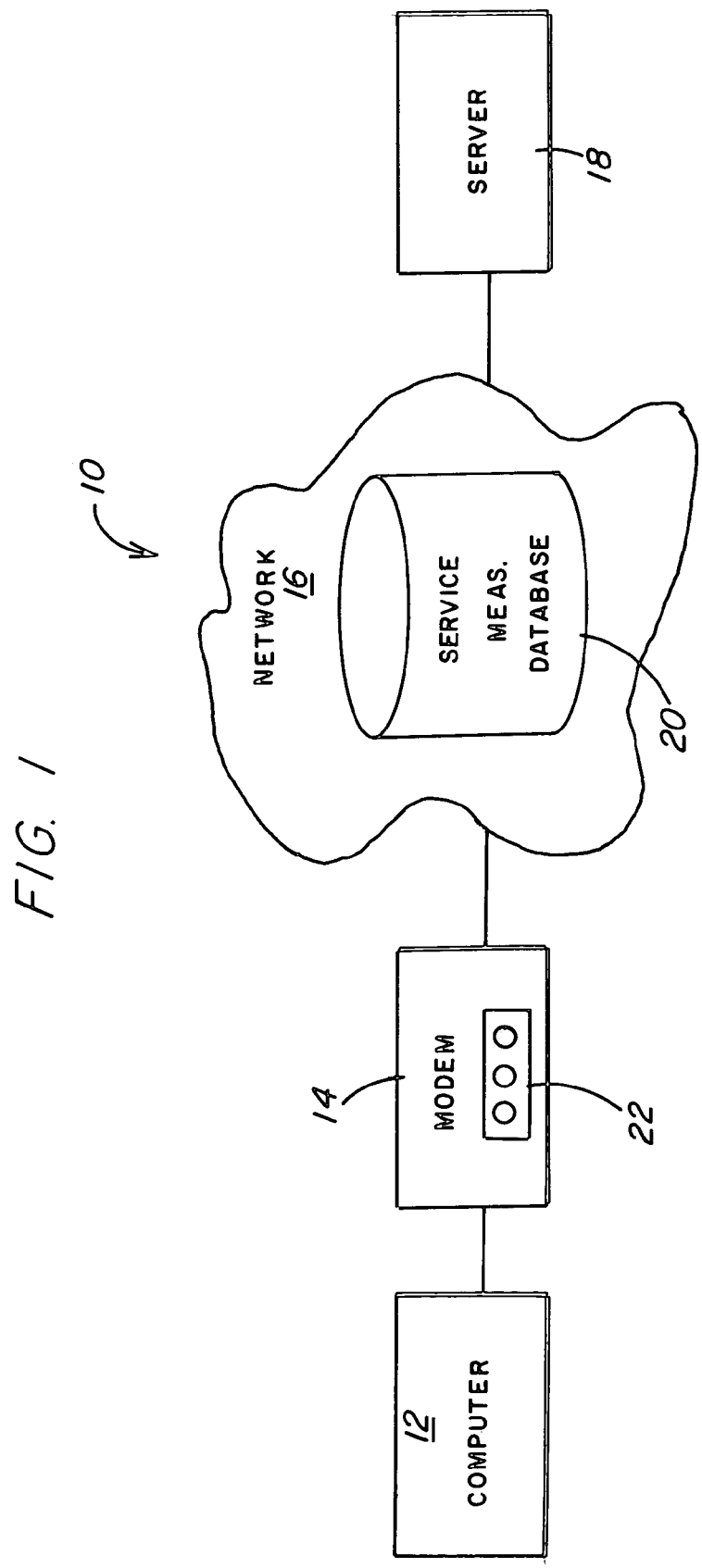
FIG. 1 is a diagram illustrating a system according to one embodiment of the present invention.

FIG. 1 is a diagram illustrating a system 10 according to one embodiment of the present invention. The system 10 includes a computer 12 that may be, for example, a personal computer, a handheld computing device, or any other type of computing device. The computer 12 is in communication with a modem 14. The modem 14 may be any type of device that modulates and demodulates signals that originate from or are intended for the computer 12. The modem 14 may be external to, internal to, or integrated with the computer 14.

The modem 14 is in communication with a network 16 via, for example, a dial-up connection, a cable connection, a wireless connection, or a DSL connection. For sake of clarity, various elements of such a communications link, such as an Internet service provider, are not illustrated in FIG. 1. The network 16 may be any type of network such as, for example, the Internet or an intranet, a local area network, a CATV network, or a DSL network. A server 18 is in communication with the network 16. The server 18 may be, for example, an application server. The server 18 collects service measurement data concerning the network 16 and parameters from the device connected to the network 16 and calculates the relative throughput that a user of the network 16 can expect in operation.

The network 16 includes or is in communication with a service measurement database 20. The database 20 stores network service measurement data that may be collected and stored by the infrastructure equipment of the network 16 by, for example, the owner or manager of the network 16.

The modem 14 includes a display area 22. The display area 22 may be, for example, a series of lights, a meter, or an iconic display area that indicates the relative throughput of the network 16. In one embodiment, the display area 22 includes three lights, or LED indicators, with one light capable of displaying the color red, one light capable of displaying in the color yellow, and one light capable of displaying in the color green. The lights would indicate, for example, low throughput, medium throughput, and high throughput, respectively, of the network 16.

Figure 2:
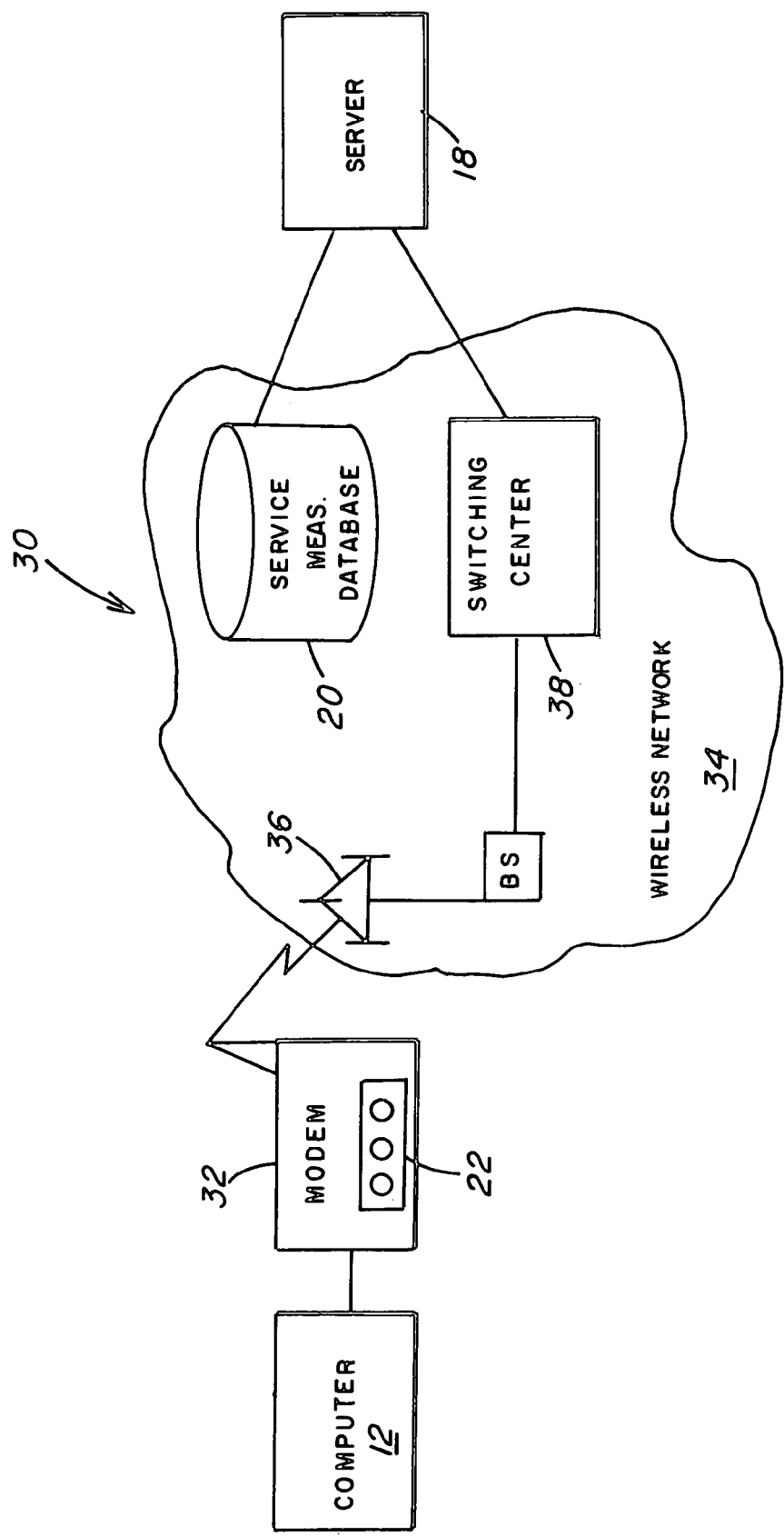
FIG. 2 is a diagram illustrating a system according to one embodiment of the present invention.

FIG. 2 is a diagram illustrating a system 30 according to one embodiment of the present invention. The system 30 includes the computer 12 and a wireless modem 32. The wireless modem 32 is in wireless communication with a wireless network 34. The network 34 includes a base station 36, a switching center 38, and the service measurement database 20. The switching center 38 may be, for example, a mobile switching center (MSC) or a packet switch.

The server 18 and the database 20 function similarly to the server 18 and the database 20 of FIG. 1 such that throughput information is conveyed to the modem 32 via that wireless network 34. The throughput information is displayed on the display area 22 of the wireless modem 34.

FIG. 3 is a diagram illustrating a process of providing data rate indications according to one embodiment of the present invention. At step 40, the modem 14, 32 measures various parameters that are local to the environment of the modem 14, 32 such as, for example, the Signal to Interference+ Noise Ratio (SINR) and Received Signal Strength (RSS). Then, the modem 32 may, in the case of the system 30 of FIG. 2, use out of band signaling to the network 34 to determine, for example, the primary serving site, the sector, and the RF carrier. Such measurements may be initiated by, for example, a user of the computer 12 pressing a button on the modem 14, 32, selecting an icon or similar display information on a graphical user interface (GUI) of the computer 12, or automatically at a predetermined or random interval as timed by the modem 14, 32 or the computer 12.

At step 42, the parameters are sent, via the network 16, 34, to the server 18. In the case of the system 30 of FIG. 2, the message may be, for example, an SMS message or an MMS message that is addressed to the server 18 and contains the RSS and SIR values and the serving site, sector, and carrier information ascertained at step 40, in addition to a terminal identifier.

At step 44, the server 18 queries the service measurement database 20 to obtain data relating to the performance of the network 16, 34. Such data may include, for example, the most recent peg counts for various metrics such as, for example, voice traffic/sector/carrier, data traffic/sector/carrier, origination failures, and dropped calls, or any type of network loading condition measurement.

At step 46, the server 18 estimates the throughput of the network 16, 34 based on the parameters received at step 42 and the data received at step 44. The server 18 may estimate the throughput as, for example, the forward link relative throughput that a user of the computer 12 should expect. The throughput may be represented as a numerical value, a range of numerical values, or any other type of representation that indicates the relative throughput of the network 16, 34.

At step 48, the server 18 transmits the estimated throughput value to the modem 14, 32 via the network 16, 34. In the case of the system 30 of FIG. 2, the throughput may be transmitted as, for example, an SMS or MMS message to the modem 32. At step 50, the modem 14, 32 or the computer 12 displays the results of the throughput estimation.

It can be understood that the processes and procedures described herein may be operated as, for example, a subscription-based service by, for example, a telecommunications service provider, a telecommunications network owner or operator, or as a separate service.

The term "computer-readable medium" as used herein may include, for example, magnetic and optical memory devices such as diskettes, compact discs of both read-only and writeable varieties, optical disk drives, and hard disk drives. A computer-readable medium may also include memory storage that can be physical, virtual, permanent, temporary, semi-permanent and/or semi-temporary. A computer-readable medium may further include one or more data signals transmitted on one or more carrier waves.

The various portions and components of various embodiments of the present invention can be implemented in computer software code using, for example, Visual Basic, C, or C++ computer languages using, for example, object-oriented techniques.

While several embodiments of the invention have been described, it should be apparent, however, that various modifications, alterations and adaptations to those embodiments may occur to persons skilled in the art with the attainment of some or all of the advantages of the present invention. It is therefore intended to cover all such modifications, alterations and adaptations without departing from the scope and spirit of the present invention as defined by the appended claims.

What is claimed is:

1. A method of communicating a relative throughput to a user of a device, comprising:

measuring at least one parameter associated with Received Signal Strength (RSS) local to an environment of a modem;

using out of band signaling from said modem to a network to determine at least one other parameter associated with a primary serving site, a sector and a carrier associated with communications between said modem and said network;

sending said at least one parameter, said primary serving site, said sector, and said carrier, from said modem through said network to a server;

querying, from said server, a service measurement database;

obtaining, from said service measurement database, data relating to a performance of said network, wherein said data relating to the performance of said network contains information associated with at least one of voice traffic/sector/carrier, dropped calls and origination failures;

estimating throughput of said network by said server based on said parameters and said data, wherein said throughput indicates relative throughput of said network to said modem;

transmitting said estimated throughput to said modem via said network; and displaying said estimated throughput on said modem.

2. The method of claim 1, wherein the server includes an application server.

3. The method of claim 1, wherein the network is one of a wireless network, a wireline network, the Internet, and an intranet.

4. The method of claim 1, wherein the device includes one of a personal computer and a handheld computing device.

5. The method of claim 1, wherein the modem includes a display area that is configured to display an indication of the throughput of the network.

6. The method of claim 5, wherein said display area includes three lights, wherein one of said three lights is capable of displaying the color red, one of said three lights is capable of displaying the color yellow and one of said three lights is capable of displaying the color green.

7. The method of claim 6, wherein said light displaying the color red indicates low throughput.

8. The method of claim 6, wherein said light displaying the color yellow indicates medium throughput.

9. The method of claim 6, wherein said light displaying the color green indicates high throughput.

10. The method of claim 1, wherein the server is in communication with a service center.

11. The method of claim 1, wherein the modem is one of a wireless modem and a landline modem.

12. The method of claim 1, wherein estimating the network throughput includes calculating a forward link relative throughput.

13. The method of claim 1, wherein estimating the network throughput includes calculating the network throughput as one of a numerical value and a range of numerical values.

14. The method of claim 1, wherein sending said at least one parameter includes sending at least one of an SMS message or a MMS message.

15. The method of claim 1, wherein measuring at least one parameter includes measuring a signal-to-interference ratio (SIR).

* * * * *